United States Patent [19]

Vaughn, Jr. et al.

[11] 4,246,038

[45] Jan. 20, 1981

[54] SILICONE ABRASION RESISTANT COATINGS FOR PLASTICS

[75] Inventors: Howard A. Vaughn, Jr.; Fred F. Holub, both of Schenectady, N.Y.

[73] Assignee: General Electric Company, Waterford, N.Y.

[21] Appl. No.: 901,543

[22] Filed: May 1, 1978

Related U.S. Application Data

[63] Continuation-in-part of Ser. No. 745,151, Nov. 26, 1976, abandoned.

[51] Int. Cl.³ .............................................. C09K 3/00
[52] U.S. Cl. ................................................ 106/287.16
[58] Field of Search .................................. 106/287.16; 260/448.8 R

[56] References Cited

U.S. PATENT DOCUMENTS

3,576,031  4/1971  Holub et al. ...................... 260/448.2
3,922,436  11/1975  Bell et al. ....................... 260/448.8 R

*Primary Examiner*—Theodore Morris
*Attorney, Agent, or Firm*—Michael J. Doyle; E. Philip Koltos; John L. Young

[57] ABSTRACT

There is provided by the present case a novel primer composition for plastics, metals, glass and ceramics composed of optionally a silane containing hydrolyzable groups and functional groups such as, alkoxy nitrogen functional groups mixed with the reaction product of the foregoing silane and an anhydride selected from the class consisting of cyclic anhydrides and cyclic dianhydrides. The foregoing primer composition is usually applied to the substrate to be protected in solution form utilizing, preferably, an aliphatic alcohol solvent. The abrasion protective top layer itself consists of at 80 to 100% solids of a silane which may be an alkoxylated silane or more preferably an acyloxy functional silane wherein the top coat is preferably cured on top of primer layer which is applied to the substrate at a temperature of anywhere from 25° to 130° C. depending on the glass transition temperature of the substrate which should not be exceeded.

3 Claims, No Drawings

SILICONE ABRASION RESISTANT COATINGS FOR PLASTICS

BACKGROUND OF THE INVENTION

The present application is a continuation-in-part application of parent application Serial No. 745,151 filed on Nov. 26, 1976 now abandoned.

The present invention relates to primer compositions and silicone top coats for thermoplastics, metals and glass and more specifically the present invention relates to silicone primer compositions and silicone top coat compositions for application to thermoplastics so as to render such thermoplastics more resistant to abrasion and resistant to the elements.

Abrasion resistance is important for metals, glass, ceramics but is more important in many respects for plastics. Even in the case of metals when it is desired that such metals maintain a highly polished surface over a prolonged period of time it is desired that such metals be coated with a top coat so that they can resist scratching and marring by various objects for as long as possible.

In the case of plastics, glass and ceramics, especially when it is desired that these materials have a transparent or see-through appearance, such top coats are even more desirable. In the case of glass and ceramics, the above can easily be understood since glass and ceramics are easily subject to scratching and marring by a hard object. Accordingly, such abrasion resistant coatings are highly desirable for glass surfaces so as to prevent their being scratched by a hard object so as to mar the surface and give it an unsightly appearance.

In the case of thermoplastics as distinguished from thermosetting plastics, the need for a protective top coat is even greater. Such plastics as polycarbonates are extremely tough thermal plastics, and have a very high impact resistant. However, their surfaces due to the thermoplastic nature of the polycarbonates is susceptible somewhat to marring or scratching by hard objects and their surfaces are in some respect susceptible to the effect of the elements. Accordingly, it has become highly desirable not only in the case of polycarbonates but many other plastics such as, polyvinylchloride plastics and polystyrene plastics to provide such plastics with a coating which would allow the plastic to have an added resistance to scratching and marring of the surface when exposed to abrasive material. Clark U.S. Pat. No. 3,986,997 discloses such an abrasion resistant coating for plastics.

It is also desirable that such top coats impart to the underlying plastic some resistance to degradation by ultra-violet light and the gradual degrading effects of the elements. Some top coats have been suggested such as, for instance, the alkoxylated silanes as top coats for plastics are, for instance, the disclosure in U.S. Pat. No. 3,720,699, and also U.S. Pat. No. 3,650,808. It also has been normal in the application of such silicone or silane top coats to line the plastic, metal, or glass surfaces with a primer composition so that the silane top coat will adhere to the underlined substrate. If such a primer composition is not utilized it is normal for the silicone top coat to easily peel-off upon curing from the underlying substrates and specifically the plastic substrate.

Many types of primer compositions have been suggested for such silicone top coats. All of such primer compositions while being efficient to some degree have not been as efficient as would be desired in adhering the silane top coat to the underlined substrate.

Further, even though some alkoxylated silanes do provide to some measure agreeable top coats, it was highly desirable to evolve or develop an even better silane for a top coat for substrates and specifically for thermoplastic substrates. In addition, as stated previously, it was highly desirable to obtain a very efficient primer composition that would bond thoroughly all silane top coats, most alkoxylated silane top coats and also acyloxy functional silane top coats to thermoplastic substrates and more specifically bond such top coats to polycarbonate plastic substrates.

Accordingly, it is one object of the present invention to provide for a novel and efficient primer composition for silicone top coats to thermoplastic metal and glass substrates.

It is an additional object of the present invention to provide for a more efficient silicone top coat in that the silicone top coat will have stronger resistance to marring and scratching by sharp objects and will be more resistant to the elements than was possible with prior silicone top coats. It is yet an additional object of the present invention to provide for a novel combination of a primer composition and a silicone top coat for thermoplastics wherein the primer composition will more efficiently bond the silicone top coat to the thermoplastic substrate than was possible heretofore.

It is still an additional object of the present invention to provide for a novel combination of a primer composition and a silicone top coat wherein the combination will provide to specific polycarbonate substrates, a more efficient resistance to abrasion and the elements. These and other objects of the present invention are accomplished by means of the disclosure set forth hereinbelow.

SUMMARY OF THE INVENTION

There is provided by the present invention a silicone primer composition for plastics, metals, glass and ceramics, and laminates of the foregoing materials comprising (a) a silane of the formula,

where R is selected from the class consisting of hydrogen and alkyl radicals, X is selected from the class consisting of hydrogen, alkyl radicals and aryl radicals, $R^1$ is selected from the class consisting of arylene radicals and alkylene radicals of 2 to 8 carbon atoms and W is selected from the class consisting of carboxylic acid radicals, epoxy radicals, hydroxyalkyl radicals, nitrogen functional alkyl radicals, nitrogen functional alkyl radicals further functionalized by radicals selected from carbonyl and alkenyl radicals, carboxyl functional alkenyl radicals, and wherein in the above formula n varies from 0 to 2, c is 1 and; (b) the reaction product of the foregoing silane and an anhydride selected from the class consisting of cyclic anhydride and cyclic dianhydrides and; (c) a solvent selected from the class consisting of aliphatic solvents having 1 to 8 carbon atoms and cyclic aliphatic solvents. The preferred solvent for utilization on thermoplastics is a blend of ethanol and butanol and specifically n-butanol. The preferred silane is gamma-aminopropyl-triethoxysilane while a preferred anhydride in the reaction product is maleic anhydride.

The silicone top coat that is applied to the foregoing primer composition which is preferably cured by simply letting the solvent evaporate is a silane selected from silanes of the formula, $$R_a^2 Si(OR^3)_{4-a} \quad (2)$$

and silanes of the formula, $$R_b^4 Si(OCOR^5)_{4-b} \quad (3)$$

and partial hydrolysis products thereof where $R^2$ and $R^3$ are selected from monovalent hydrocarbon radicals and halogenated monovalent hydrocarbon radicals and are preferably alkyl radicals of 1 to 8 carbon atoms, where a is zero or 1, and $R^4$ and $R^5$ may be monovalent hydrocarbon radicals and halogenated monovalent hydrocarbon radicals but preferably alkyl radicals of 1 to 8 carbon atoms, where b may vary from 0 to 2. The above silanes or partial hydrolysis products of such silanes are applied in anywhere from 30 to 100% solids wherein the only solvent or other additive permissible is water in order to produce a partial hydrolysis product which may be applied above the primer layer to the substrate whether it be a thermoplastic substrate, metal or glass. Such silane top coat is then allowed to cure at a temperature anywhere from 20° to 130° C. The silicone top coat has to be cured preferably at an elevated temperature to effect the proper cure but the temperature has to be below the glass transition temperature of the thermoplastic if a thermoplastic is used. Of course, if the glass transition temperature of the thermoplastic is exceeded then the thermoplastic part may become deformed and lose its utility.

Another topcoat comprises a dispersion of colloidal silica in a lower aliphatic alcohol-water solution of the partial condensate of a silanol of the formula $R^6 Si(OH)_3$ in which $R^6$ is selected from the group consisting of alkyl radicals of 1 to 3, inclusive carbon atoms, vinyl, 3,3,3, trifluoropropyl, gamma-glycidoxypropyl radical and gamma-methacryloxypropyl, at least 70 weight percent of the silanol being $CH_3 Si(OH)_3$, said composition containing 10 to 50 weight percent solids consisting essentially of 10 to 70 weight percent colloidal silica and 30 to 90 weight percent of the partial condensate, said compositions consisting sufficient acid to provide a pH in the range of 3.0 to 6.0.

The most preferable silicone top coat in accordance with the instant invention for thermoplastics and more specifically polycarbonate plastics is the top coat formed from the partial condensate.

DESCRIPTION OF THE PREFERRED EMBODIMENT

The R group in the Formula 1 of the foregoing silane used in the primer composition can be selected from any monovalent hydrocarbon radical, halogenated monovalent hydrocarbon radical such as alkyl radicals, alkenyl radicals, aryl radicals, cycloalkyl radicals, etc. Most preferably the R group is selected from the class consisting of hydrogen and alkyl radicals of 1 to 8 carbon atoms. The X radical in the foregoing Formula 1 of the silane may also be selected from any monovalent hydrocarbon radical, specifically alkyl and aryl radicals, as well as hydrogen. Most preferably the X radical is selected from the class consisting of hydrogen and alkyl radicals of 1 to 8 carbon atoms and aryl radicals and more specifically, phenyl. The $R^1$ radical can be selected from alkylene radicals of 2 to 8 carbon atoms such as, ethylene radicals and arylene radicals. Since $R^1$ is a linear divalent hydrocarbon radical such as an alkylene radical of 2 to 8 carbon atoms, c is 1. In the above Formula 1 of the silane, n is a whole number that may vary from 0 to 2, and is preferably 0. In this respect when n is equal to 0 more preferably the R is methyl or ethyl. With respect to the W radical, it may be selected from a wide range of radicals such as epoxy radicals, hydroxyalkyl radicals, mercapto functional alkyl radicals, nitrogen functional alkyl radicals, nitrogen functional alkyl radicals further functionalized by radicals selected from carbonyl and alkenyl radicals, carboxyl functional alkenyl radicals and sulfur functional alkyl radicals which may further be functionalized by carbonyl groups. The most preferred radical substituent groups represented by $R^1$ and W are $R^1$ being ethylene and W being a nitrogen functional alkyl radicals. One example of such a preferred compound silane within the scope of the silane of Formula 1, is, for instance, gamma-aminopropyltriethoxysilane and the other well known nitrogen functional silanes.

The preferred substituent groups for W are, for instance,

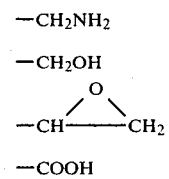

—CH$_2$NH$_2$

—CH$_2$OH

—COOH

The above functional silanes are well known in the art and are well known to producers of silicone materials. A disclosure as to the production of the nitrogen functional silanes is, for instance, to be found in U.S. Pat. No. 3,888,815-Bessmer/Lampe. Such functional silanes as those represented by Formula 1, as defined above, are also manufactured and/or sold by the following chemical companies:

Silicone Products Department
General Electric Company
Dow Corning Corporation
Union Carbide Corporation The preferred primer composition within the scope of the present invention contains the foregoing silane of Formula 1, as a reaction product with any cyclic anhydride or dianhydride such as, for instance, the following cyclic anhydrides and dianhydrides:

Maleic anhydride;
Nadic anhydride;
Phthalic anhydride;
Succinic anhydride;
pyromelliticdianhydride (PMDA);
2,3,6,7,-naphthalene tetracarboxylic dianhydride;
3,3,4,4'-diphenyl tetracarboxylic dianhydride;
1,2,5,6-naphthalene tetracarboxylic dianhydride;
2,2',3,3'-diphenyltetracarboxylic dianhydride;
2,2-bis(3,4-dicarboxyphenyl)propanedianhydride;
bis(3,4-dicarboxyphenyl) sulfone dianhydride;
benzophenone tetracarboxylic acid dianhydride(BPDA);
perylene-1,2,7,8-tetracarboxylic acid dianhydride;
bis(3,4-dicarboxyphenyl) ether dianhydride; and
bis(3,4-dicarboxyphenyl)methane dianhydride;

and aliphatic anhydrides such as cyclopentane tetracarboxylic dianhydride, cyclohexane tetracarboxylic dianhydride, butane tetracarboxylic dianhydride, as well as anhydrides of the following structure:

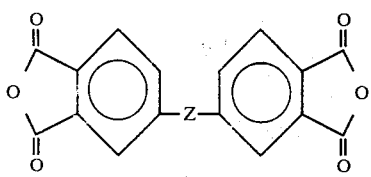

where Z is

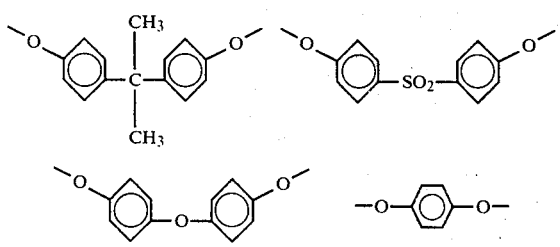

The silane additive may also be the product of the Michael Addition of

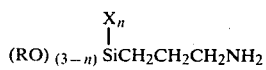

to maleic anhydride, or maleimide where R and X are as previously defined. The above organic anhydrides and dianhydrides are specifically sold by many chemical companies or suppliers of chemicals such as, Aldrich Chemical Co., Inc.,
Allied Chemical Corp.,
Gulf Chemical Co.

The most preferred anhydrides for use in the primer solution of the instant case are maleic anhydride, nadic anhydride, phthalic anhydride and succinic anhydride and more specifically maleic anhydride. The reaction product of the silane of Formula 1 and the cyclic anhydrides or dianhydrides are simply obtained by mixing the two materials and allowing them to react. Although the reaction product of the cyclic anhydrides and dianhydrides with the foregoing silane of Formula 1 may be utilized as a primer composition in the instant case, it is preferred in most instances to have some of the unreacted silane of Formula 1 in the reaction mixture. Accordingly, it is possible to have a primer composition within the scope of the instant case where the solids level varies anywhere from 10 to 90% of the reaction product of the silane of Formula 1 with a cyclic anhydride or cyclic dianhydride in accordance with the above disclosure, and more preferably where the reaction product varies at a concentration of 30 to 70% solids of the solution. Solvents for the utilization and application of a primer composition may vary widely in the case where the surface to be primed is glass, ceramics or metals. For instance, for such applications the aromatic solvents may be utilized such as, xylene and toluene, as well as benzene. In the case where the substrate that is to be primed is a plastic then more care has to be utilized in the selection of a solvent. In the case when the substrate that is to be primed is one of the thermoplastics and more specifically a polycarbonate plastic, then it is preferred that there be utilized as a solvent an aliphatic alcohol and generally any aliphatic alcohol having 1 to 8 carbon atoms and more specifically an aliphatic alcohol having from 2 to 8 carbon atoms. It is also possible for such thermoplastic materials, to utilize saturated aliphatic solvents such as, hexane, heptane, etc. of up to 8 carbon atoms. Most preferably the solvent for utilization for the application of the primer composition of the instant case is ethanol or butanol. In the instant primer composition, as a basic requirement, there must be the reaction product of the foregoing silanes of Formula 1 with a cyclic anhydride or cyclic dianhydride as explained previously. More preferably and more specifically in the preferred embodiment of the instant case the preferred primer composition not only includes the reaction product of the foregoing silanes of Formula 1 with an anhydride or a cyclic dianhydride but also includes in said primer composition, one of the preferred solvents mentioned above. There is also preferably present a certain amount of the unreacted silane of Formula 1 in the primer solution. Accordingly, broadly, the primer solution may contain from 0 to 40% by weight of a silane of Formula 1, from 1 to 40% by weight of the reaction product of the silane of Formula 1 with the cyclic anhydrides or dianhydrides, and from 20 to 99% by weight of the solvent for the mixture. Of course, within the above limitations stated previously, there can be wide variations in the particular anhydride or dianhydride selected and in the particular silane of Formula 1 and the particular solvent. In addition, the concentrations of the various ingredients within the above limitations can be picked as such so as to yield the maximum effect for a particular application, and specifically the application to a specific substrate. The above primer composition has been found suitable for the adhering of silicone top coats to various substrates and more specifically metals, glass, ceramic and thermoplastic substrates and more specifically thermoplastic substrates such as, polycarbonate, polyphenylene oxide, polystyrene and polyvinylchloride thermoplastic substrates. It should also be mentioned that while the most preferred functional silanes of Formula 1 are gamma-aminopropyltriethoxysilane and hydroxypropyltriethoxysilane there is a wide selection in the particular silane utilized since any of the foregoing silanes if they come within the scope of Formula 1 as discussed previously are acceptable ingredients for producing the primer composition of the instant case. There is preferred the nitrogen functional silanes for producing a primer composition in accordance with the instant case for application to polycarbonate plastics.

It should be noted that the primer composition of the instant case may be used to adhere various silicone top coats to the outer surface of multi-ply laminates made from the various materials disclosed above. The abrasion resistant coating will protect the outer surface of the laminate from damage.

The primer composition solution is simply applied to the clean surface of the substrate and preferably applied at less than 0.1 millimeters in thickness and the solvent is allowed to evaporate leaving the primer composition adhered to the surface of the substrate. The primer composition cures by itself at room temperature or at elevated temperatures by its own self catalyzed reaction. Preferably, at this time, after the solvent has evaporated, the silicone top coat is applied over the cured primer layer. In the more preferable procedure the primer composition is first applied to the substrate and the solvent is allowed to evaporate, to leave behind the cured primer layer on the substrate. Then the silicone top coat is applied thereover and allowed to cure. Examples of good silicone top coats for the foregoing substrates identified previously are the foregoing alkoxylated and acyloxy functional silanes identified previously. Such alkoxylated and acyloxy functional silanes are well known materials to silicone manufacturers and are easily obtainable. With respect to the acyloxy functional silanes, these materials are applied without any solvent since it has been found that the use of solvents in application of such top coats at times seriously degrades the applied silicone top coat. Preferably, the silanes of Formula 3, that is the acyloxy functional silanes are applied at 100% solids or form 30 to 100% solids in the case of the acyloxy silanes where the solids are less than 100% the silane is simply the water hydrolysis product or partially hydrolyzed product of the foregoing acyloxy functional silanes of Formula 3. The alkoxylated silanes can be applied in the same solids concentration as above utilizing solvents or as a partial hydrolysis product with water. The partial hydrolysis products of the foregoing alkoxy functional silanes and acyloxy functional silanes of Formulas 2 and 3 can be utilized as a silicone top coat in the invention of the instant case. When the solids content is less than 30% it has been found that the top coat produced by such low solids content partial hydrolysis product is not as effective as would be desired. With respect to the foregoing alkoxy functional and acyloxy functional silanes mentioned above, such materials are well known in the art as, for instance, noted in the foregoing Bessmer and Lampe patent, as well as, for instance, in the patent of H. P. Shaw, U.S. Pat. No. 3,701,753. In the foregoing formulas of the alkoxy functional silanes of Formula 2, $R^2$ and $R^3$ are preferably any monovalent hydrocarbon radical or halogenated monovalent hydrocarbon radical. Most preferably, $R^2$ and $R^3$ are selected from methyl and phenyl radicals of from 1 to 8 carbon atoms. In such formulation "a" generally may vary anywhere from 0 to 1 and is most preferably one. In Formula 3 of the foregoing acyloxy functional silanes, $R^4$ and $R^5$ can be selected from monovalent hydrocarbon radicals or halogenated monovalent hydrocarbon radicals, and are more preferably selected from alkyl radicals and phenyl radicals of 1 to 8 carbon atoms. In such formulation of the acyloxy functional silanes of Formula 3, preferably, b is 1 but can be a whole number varying anywhere from 0 to 2. It has been noted from experimentation that in the use of such acyloxy functional silanes of Formula 3, as silicone top coats, there should be at least two acyloxy functional groups in the silane molecule for effective results. In a preferred embodiment of the instant case for the application of a silicone top coat with the maximum efficiency as far as abrasion resistance and resistance to the elements, the foregoing acyloxy functional silanes of Formula 3 are preferred over the alkoxylated silanes.

In a modification of the preferred embodiment, the primer composition may first be mixed with the acyloxy functional top coat composition and applied as such. Such a procedure simplifies the application of the primer composition and acyloxy functional top coats and results in better abrasion resistance. However, such was found to be true only with the acyloxy functional silicone top coat. For the application of the other type of silicone top coats such as the partial condensate top coats, it is preferred to apply the primer compositions; minus the solvent mixed with the top coat and apply the top coat. If such a procedure is not followed, the coating will turn into the color while. Accordingly, with the acyloxy functional top coat, the reaction product of the silane of Formula 1 with the cyclic anhydrides or dianhydrides may be added alone or with some of the unreacted silanes of Formula 1 and mixed with the acyloxy functional top coat and the mixture applied to the substrate.

Another top coat that will be used with the present invention, is a coating composition comprising a dispersion of colloidal silica in lower aliphatic alcohol-water solution of the partial condensate of a silanol of the Formula $R^4Si(OH)_3$ in which $R^4$ is selected from the group consisting of alkyl radicals of 1 to 3 inclusive carbon atoms the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$ said composition containing 10 to 50 weight percent solids said solids consisting essentially of 10 to 70 weight percent colloidal silica and 30 to 90 weight percent of the partial condensate, said composition containing sufficient acid to provide a pH in the range of 3.0 to 6.0.

As described above, the non-volatile solids portion of the coating composition is a mixture of colloidal silica and the partial condensate of a silanol. The major portion of the partial condensate or siloxanol is obtained from the condensation of $CH_3Si(OH)_3$; a minor portion, if desired, being obtained from cocondensation with $C_2H_5Si(OH)_3$, $C_3H_7Si(OH)_3$, $CH_2=CHSi(OH)_3$.

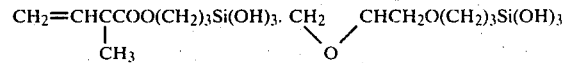

or mixtures thereof. From both the standpoint of economy and optimum properties in the cured coating it is preferred to utilize all monomethyltrisilanol in formulating the composition.

The trisilanols are generated in situ by adding the corresponding trialkoxysilanes to acidic aqueous dispersions of colloidal silica. Suitable trialkoxysilanes are those containing methoxy, ethoxy, isopropoxy and t-butoxy substituents, which upon hydrolysis liberate the corresponding alcohol; thus, generating at least a portion of the alcohol present in the coating composition. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the polymer soluble in the water-alcohol solvent. This soluble partial condensate can be characterized as a siloxanol polymer having at least one silicon-bonded hydroxyl group per every three —SiO— units. During curing of the coating on a substrate, these residual hydroxyls condense to give a silsesquioxane, $RSiO_{3/2}$.

The silica component of the composition is present as colloidal silica. Aqueous colloidal silica dispersions generally have a particle size in the range of 5 to 150 millimicrons in diameter. These silica dispersions are prepared by methods wellknown in the art and are commercially available under such registered trademarks as "Ludox" and "Nalcoag". It is preferred to use colloidal silica of 10–30 millimicron particle size in order to obtain dispersions having a greater stability and to provide coatings having superior optical properties. Colloidal silicas of this type are relatively free of $Na_2O$ and other alkali metal oxides, generally containing less than 2 weight percent, preferably less than 1 weight percent $Na_2O$. They are available as both acidic and basic hydrosols. Colloidal silica is distinguished from other water dispersable forms of $SiO_2$, such as nonparticulate polysilicic acid or alkali metal silicate solutions.

The silica is dispersed in a solution of the siloxanol carried in a lower aliphatic alcohol-water cosolvent. Suitable lower aliphatic alcohols include methanol, ethanol, isopropanol, and t-butyl alcohol. Mixtures of such alcohols can be used. Isopropanol is the preferred alcohol and when mixtures of alcohol are utilized, it is preferred to utilize at least 50 weight percent of isopropanol in the mixture to obtain optimum adhesion of the coating. The solvent system should contain from about 20 to 75 weight percent alcohol to ensure solubility of the siloxanol. Optionally one can utilize an additional water-miscible polar solvent, such as acetone, butyl cellosolve and the like in a minor amount.

To obtain optimum properties in the coating and to prevent gellation of the coating composition, it is preferred that there be sufficient acid to provide a pH of from 3.0 to 6.0. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. It is preferred to add sufficient water-miscible carboxylic acid selected from the group consisting of acetic, formic, propionic and maleic acids to provide pH in the range of 4 to 5.5 in the coating composition. In addition to providing good bath life, the alkali metal salts of these acids are soluble, thus allowing the use of these acids with silicas containing a substantial (greater than 0.2% $Na_2O$) amount of alkali metal or metal oxide.

The coating compositions are easily prepared by adding trialkoxysilanes, such as $R^6Si(OCH_3)_3$, to colloidal silica hydrosols and adjusting the pH to the desired level by addition of the organic acid. The acid can be added to either the silane or the hydrosol prior to mixing the two components provided that the mixing is done rapidly. The amount of acid necessary to obtain the desired pH will depend on the alkali metal content of the silica but is usually less than one weight percent of the composition. Alcohol is generated by hydrolysis of the alkoxy substituents of the silane, for example, hydrolysis of one mole of $-Si(OC_2H_5)_3$ generates 3 moles of ethanol. Depending upon the percent solids desired in the final composition, additional alcohol, water or a water-miscible solvent can be added. The composition should be well mixed and allowed to age for a short period of time to ensure formation of the partial condensate. The coating composition thus obtained is a clear of slightly hazy low viscosity fluid which is stable for several days. The condensation of —SiOH continues at a very slow rate and the composition will eventually form gel structures. The bath life of the composition can be extended by maintaining the dispersion at below room temperature, for example at 40° F.

Buffered latent condensation catalysts can be added to the composition so that milder curing conditions can be utilized to obtain the optimum abrasion resistance in the final coating. Alkali metal salts of carboxylic acids, such as potassium formate, are one class of such latent catalysts. The amine carboxylates and quaternary ammonium carboxylates are another such class of latent catalysts. Of course the catalyst must be soluble or at least misbilbe in the cosolvent system. The catalysts are latent to the extent that at room temperature they do not appreciably shorten the bath life of the composition, but upon heating the catalysts dissociates and generates a catalytic species active to promote condensation, for example an amine. Buffered catalysts are used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the composition, the bath life is shortened and optical properties of the coating may be impaired. It is preferred to utilize from about 0.05 to 1 weight percent of the catalyst.

It is preferred to utilize a coating composition having a pH in the range of 4-5 which contains 10-25 weight percent solids; the silica portion having a particle size in the range of 5-30 millimicrons; the partial condensate of $CH_3Si(OH)_3$ being present in an amount in the range of 35 to 55 weight percent of the total solids in a cosolvent of methanol, isopropanol and water, the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a composition is relatively stable, having a bath life of approximately one month, and, when coated onto a substrate, can be cured in a relatively short time at temperatures in the range of 75°-125° C. to provide a transparent abrasion resistant surface coating.

The coating compositions can be applied to solid substrates by conventional methods, such as flowing, spraying or dipping to form a continuous surface film. Although substrates of soft plastic sheet material show the greatest improvement upon application of the coating, the composition can be applied to other substrates, such as wood, metal, printed surfaces, leather, glass, ceramics and textiles. As noted above, the compositions are especially usefule as coatings for dimensionally stable synthetic organic polymeric substrates in sheet or film form, such as acrylic polymers, for example, poly(methylmethacrylate), polyesters, for example poly(ethyleneterephthalate) and polycarbonates, such as poly(diphenylolpropane)carbonate and poly(diethylene glycol bis allyl)carbonate, polyamides, polyimides, copolymers of acrylonitrile-styrene, styrene-acrylonitrile-butadiene copolymers, polyvinyl chloride, butyrates, polyethylene and the like. The composition will air dry to a tack-free condition, but heating in the range of 50° to 150° C. is necessary to obtain condensation of residual silanols in the partial condensate. This final cure results in the formation of silsesquioxane of the formula $RSiO_{3/2}$ and greatly enhances the abrasion resistance of the coating. The coating thickness can be varied by means of the particular application technique, but coatings of about 0.5 to 20 micron preferably 2–10 micron thickness are generally utilized. Especially thin coatings can be obtained by spin coating.

These are not the only silicone top coats that may be utilized with the primer composition of the instant case. Less preferred silicone top coats which can be hydrolyzed or partially dissolved in a solvent in the foregoing solids content of 30 to 100% solids are, for instance, silicone resins composed of trifunctional and difunctional units, silicone resins composed of trifunctional units, difunctional units and tetrafunctional units where the organo substituent groups in the trifunctional units may be selected from alkyl radicals of 1 to 8 carbon atoms and are preferably, methyl, phenyl and vinyl; and wherein the organo substituent groups in the difunctional siloxy units may be selected again from alkyl radicals of 1 to 8 carbon atoms, vinyl radicals and phenyl radicals. Such silicone resins usually have an organic to silicon atom ratio of 1:1 to 1.9:1; may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in the patents of Duane F. Merrill, i.e., U.S. Pat. Nos. 3,375,223, 3,435,001, 3,450,672, 3,790,527, 3,832,319, 3,865,766, 3,887,514 and 3,925,276. However, it must be pointed out that such silicone resins are not the preferred silicone top coat materials of the invention of the instant case. The foregoing alkoxy silanes of Formula 2 and the foregoing acyloxy functional silanes of Formula 3 are the most preferred. Other well known silicone top coat compositions for metals, plastics, ceramics and glass may be utilized with the primer composition of the instant case. As stated previously, the foregoing alkoxy functional silanes of Formula 2 and the acyloxy functional silanes of Formula 3 are preferred, with the acyloxy functional silanes of Formula 3 being the most preferred silicone top coats of the instant case for utilization with the primer composition of the instant case.

The foregoing silicone top coats is simply brushed, dipped, sprayed or flowed on top of the primer layer that is applied to whatever substrate that may be the case and allowed to cure at room temperature or elevated temperature. Preferably the silicone top coat of the instant case is cured at elevated temperatures varying from 25° to 130° C. for a period of time of anywhere from 30 minutes to 16 hour. A catalyst may or may not be used depending on the effectiveness of the catalyst.

It should be noted that it is important in such elevated temperature curing of the silicone top coat that the glass transition temperature of the substrate and specifically when the substrate is a thermoplastic that such glass transition temperature be not exceeded, otherwise the thermoplastic part will become deformed so that it loses its utility in the planned application. Although certain catalysts may be utilized to accelerate the cure of such a silicone top coat, such catalysts are not necessary if the silicone top coat is cured by itself at the elevated temperature for a sufficient length of time. As mentioned previously, the primer composition may either be cured at room temperature or at elevated temperature without any catalyst. Accordingly, in accordance with the instant invention there is not only provided a novel primer composition for excellent adhesion of silicone top coats to various substrates but there is also provided an excellent silicone top coat for use with such primer compositions to protect the substrates of metals, glass, ceramics and thermoplastics from abrasion and also from protection from the environment. In addition, it should be noted in the silicone top coat there may be added various other ingredients to protect the underlying substrate from ultra-violet rays. The foregoing primer composition and silicone top coat has utility for protecting polycarbonate and polyphenylene oxide substrates from abrasion and also from deterioration by the elements. The aromatic carbonate polymers employed in the practice of this invention are homopolymers and co-polymers that are prepared by reacting a dihydric phenol with a carbonate precursor. The dihydric phenols that can be employed are bisphenols such as bis(4-hydroxyphenyl) methane,2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2-2-bis(4-hydroxy-3,5-dichlorophenyl) propane, 2,2-bis(4-hydroxy-3,5-dibromophenyl) propane etc., dihydric phenol ethers such as bis(4-hydroxyphenyl) ether, bis(3,5-dichloro-4-hydroxyphenyl) ether, etc; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc., dihydroxy benzenes, resorcinol hydroquinone, halo and alkyl-substituted dihydroxy benzenes such as 1,4-dihydroxy-2,5-dichlorobenzene, 1,4-dihydroxy-3-methylbenzene, etc. and dihydroxy diphenyl sulfoxides such as bis(4-hydroxyphenyl) sulfoxide, bis-(3,5-dibromo-4-hydroxyphenyl) sulfoxide, etc. A variety of additional dihydric phenols are also available to provide carbonate polymers and are disclosed in U.S. Pat. Nos. 2,999,835, 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, etc. It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

Also included are the polymeric materials of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, and acid acceptor and a catalyst. The molecular weight regulators which may be employed in carrying out the process of this invention include phenol, cyclohexanol, methanol, para-tertiarybutylphenol, para-bromophenol, etc. Preferably, paratertiarybutylphenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkali earth metal.

The following examples are given for the purpose of illustrating the present invention in its various applications. The examples are not given for any purpose in terms of limiting the claimed invention. The substrate to which the primer compositions and top coats were applied in the Examples were in all cases a polycarbonate. All parts are by weight. The following materials are specified by number and sumbols in the foregoing tables and are herein identified as follows:

1 X is gamma-aminopropyltriethoxysilane;
2 X is a 50% solution of the reaction product of maleic anhydride and gamma-aminopropyltriethoxysilane in ethanol.
12 X is methyltriacetoxysilane;
3 X is partially hydrolyzed methyltriethoxysilane;
4 X is $CH_3O-(SiMe_2O)_n-SiMe_2OMe$ where Me is methyl;
5 X is $HO(SiMe_2O)_5SiMe_2OH$ where Me is methyl;
6 X is $MeSiO_{3/2}$ resin having a silanol content of 4 to 6% by weight where Me is methyl;
7 X is $MeSiO_{3/2}$ resin in toluene-isopropanol solvent;
8 X is a resin with $(MeSiO_{3/2})_m$ units $(Me_2SiO)_n$ units $(\phi SiO_{3/2})_o$ units with a silanol content of 2 to 7% by weight;
$m=60$, $n=4.9$, $0=35.1$, where the organic radicals to Si ratio is 1.04 and Me is methyl;
10 X is partially hydrolyzed ethyl silicate sold by Stauffer Chemical Co.
11 X is partially hydrolyzed ethyl silicate sold by the General Electric Company;
14 X is methyl(alkoxyacetoxysilane) with dibutyltin dilaurate;
15 X is 1,1,3,3-tetraacetoxy-1,3-dimethyldisiloxane
16 X is gamma-aminopropyltriethoxysilane.

The following test results are as set forth in Tables I through VIII.

In the foregoing tests set forth in Tables I through VIII, which follows the foregoing primer compositions was applied by itself or the primer composition was applied in a mixture with a silicone top coat as indicated in the tables. Most preferably, as shown in most of the table the primer composition was applied, first allowed to dry, then cured at elevated temperatures, then the various types of silicone top coats were applied thereover. The resulting cured silicone top coat was then tested for appearance, in most cases, as well as for resistance to attack by acetone which indicated that the solvent resistance of the top coat as well as its primed adhesion to the substrate since if the acetone penetrated the coating or lifted it off the primer as well as the top coat failed the test. After the acetone test the sample was then subjected to an impact test with the various pounds of weight to determine whether the coating would fly off under impact or if the impact strength of the plastic itself had deteriorated. The tables indicate how the samples faired in such tests. OK refers to the fact that the samples passed its test. Data in Tables I through VIII indicate samples of the primer composition of the instant case having alkoxy functional acyloxy functional top coats.

TABLE I

| | PARTS BY WEIGHT | | | | | | | | | | | |
|---|---|---|---|---|---|---|---|---|---|---|---|---|
| Primer | | | | | | | | | | | | |
| 1% in n-Butanol | — | — | 1× | 1× | 1× | 1× | 1× | 1× | 1× | — | 2× | 2× |
| 3× | | | | | | | | | | | | |
| 30% in n-Butanol | 5.0 | 5.0 | 5.0 | 5.0 | 5.0 | 5.0 | 5.0 | 5.0 | 5.0 | 5.0 | 5.0 | 5.0 |
| 1× | | | | | | | | | | | | |
| Neat | — | 0.25 | — | 0.25 | — | — | — | — | — | — | — | — |
| 2× | | | | | | | | | | | | |
| 50% in ethanol | 0.5 | — | 0.5 | — | 0.5 | — | 0.5 | — | — | — | 0.5 | 0.5 |
| 4× | | | | | | | | | | | | |
| Neat | — | — | — | — | 0.25 | — | — | 0.25 | — | — | 0.25 | — |
| 5× | | | | | | | | | | | | |
| Neat | — | — | — | — | — | — | 0.25 | — | 0.25 | — | — | 0.25 |
| Acetone Resistance | | | | | | | | | | | | |
| Pass/Fail | P | F | P | F | | F | P | (e) | P | F | (e) | P |
| Gardner Impact | | | | | | | | | | | | |
| 10 in/lb | OK | | OK | | | | OK | | OK | | | OK |
| 20 in/lb | OK | | OK | | | | OK | | OK | | | OK |
| 50 in/lb | | | | | | | | | OK | | OK | OK |

TABLE II

| PARTS BY WEIGHT | | | | | | | | | | | | |
|---|---|---|---|---|---|---|---|---|---|---|---|---|
| PRIMER | | | | | | | | | | | | |
| Butanol | | | | | | | 10 | 10 | 10 | 10 | 10 | |
| 2×(50% in EtOH) | | | | | | | 0.2 | 0.2 | 0.2 0.2 | 0.2 | | |
| 10×(1% in BuOH) | 10 | 10 | 10 | 10 | 10 | 10 | 10 | | | | | |
| CURE | | | | | | | | | | | | |

TABLE II-continued

| PARTS BY WEIGHT | | | | | | | | | | | | | | | | | | | | |
|---|---|---|---|---|---|---|---|---|---|---|---|---|---|---|---|---|---|---|---|---|
| (120° C.) - Air Dried 10" | | 60 | 60 | 60 | 60 | 60 | 60 | 60 | | 60 | 60 | 60 | 60 | 60 | | 60 | 60 | 60 | 60 | 60 |
| TOPCOAT | | | | | | | | | | | | | | | | | | | | |
| 3×(30% in BuOH) | 10 | 10 | 10 | 10 | 10 | 10 | 10 | 10 | 10 | 10 | 10 | 10 | 10 | 10 | | 10 | 10 | 10 | 10 | 10 |
| 2×(50% in EtOH) | 1 | | 1 | | 1 | | 1 | | | 1 | 1 | | | | 0.5 | 0.8 | 1.2 | 1.6 | 1 | 0.4 |
| 1×(100% Solids) | | 0.5 | | 0.5 | | | | | | | | | | | | | | | | |
| 4× | | | | | 0.5 | | | 0.5 | | | | 0.5 | | 0.5 | | | | | | 0.2 |
| 5× | | | | | | 0.5 | | | 0.5 | | | | 0.5 | | 0.5 | | | | | |
| CURE (120° C.)-Air Dried 10 Min. | 60 | 60 | 60 | 60 | 60 | 60 | 60 | 60 | 60 | 60 | 60 | 60 | 60 | 60 | | 60 | 60 | 60 | 60 | 60 |
| WATER IN OVEN | x | x | x | x | x | x | x | x | x | x | x | x | x | x | | x | x | x | x | x |
| NO WATER IN OVEN | | | | | | | | | | | | | | | | | | | | |
| TESTS | | | | | | | | | | | | | | | | | | | | |
| Acetone (A = Attack) | OK | A | OK | A | | A | OK | | OK | | A | OK | | A | OK | OK | OK | OK | OK | OK |
| Impact- | | | | | | | | | | | | | | | | | | | | |
| 20 in = lb. Front | OK | | OK | | | | | | | | | | | | | | | | | |
| 50 in = lb. Front | | | | | OK | | | OK | | | OK | | | OK | | | | | | |
| 70 in = lb. Front | | | | | | | | | | | | | | | LA | OK | OK | OK | OK | OK |
| COMMENTS | | | | | | | | | | | | | | | | | | | | |
| Heterogeneous Film | | | x | | x | | | x | x | | | | | | | | | | | |

A = Attack
LA = Lost Adhesion
Cr = Cracked disc
E = Excellent
G = Good
F = Fair
P = Poor

TABLE III

| PARTS BY WEIGHT | | | | | | | | | | | | | | | | |
|---|---|---|---|---|---|---|---|---|---|---|---|---|---|---|---|---|
| PRIMER | | | | | | | | | | | | | | | | |
| Butanol | 10 | 10 | 10 | 10 | 10 | 10 | 10 | 10 | | | 10 | 10 | 10 | 10 | | |
| Ethanol (190 PF) | | | | | | | | | | | | | | | | |
| LSO-Propanol | | | | | | | | | | | | | | | | |
| 2 ×(50% in EtOH) | 0.2 | 0.2 | 0.2 | 0.2 | 0.2 | 0.2 | 0.2 | 0.2 | | | 0.2 | 0.2 | 0.2 | 0.2 | | |
| Air Dry | 10 | 10 | 10 | 10 | 10 | 10 | 10 | 10 | | | 10 | 10 | 10 | 10 | | |
| Cure (130° C.) | 60 | 60 | 60 | 60 | 60 | 60 | 60 | 60 | | | 20 | 20 | 20 | 20 | | |
| TOPCOAT | | | | | | | | | | | | | | | | |
| 6× (30% in BuOH) | | | | | | | | | | | | | | | | |
| 3× (30% in BuOH) | 10 | | | | | | | | | | | | | | | |
| 7× (30% in (70% iPrOH) (30% BuOH) | | 10 | 10 | 10 | 10 | 10 | 10 | 10 | 10 | 10 | 10 | 10 | | | | |
| 8× (30% in BuOH) | | | | | | | | | | | | | 10 | 10 | 10 | 10 |
| 5× | 0.8 | | | | | | | | | | | | | | | |
| 1×(50% in EtOH) | 0.4 | 0.4 | 0.8 | 1.2 | 1.6 | 0.2 | 0.1 | 0.16 | 0.4 | 0.1 | 0.16 | 0.2 | 1 | 1 | 1 | 1 |
| 11× | | | | | | | | | | | | | | 0.25 | 0.5 | 1 |
| 10× | | | | | | | | | | | | | | | | |
| Water | | | | | | | | | | | | | | | | |
| Cure (130° C.) Air Dried 10 Min. | 60 | 60 | 60 | 60 | 60 | 60 | 60 | 60 | 60 | 60 | 60 | 60 | 60 | 60 | 60 | 60 |
| Water in Oven | x | x | x | x | x | x | x | x | x | x | x | x | x | x | x | x |
| No water in Oven | | | | | | | | | | | | | | | | |
| TESTS | | | | | | | | | | | | | | | | |
| Acetone (A=Attack) | | OK | OK | OK | OK | A | A | A | A | A | A | A | OK | OK | A | OK |
| Impact - 70 in lb Front | | OK | OK | OK | OK | | | | | | | | | | | |
| 80 in lb Front | OK | | | | | | | | | | | | OK | LA | LA | LA |
| -Back | | | | | | | | | | | | | LA | | | LA |
| Cross-Hatch Adhesion | | | | | | | | | | | | | | | | 0 |

| | PARTS BY WEIGHT | | | | | | | | | | | |
|---|---|---|---|---|---|---|---|---|---|---|---|---|
| PRIMER | | | | | | | | | | | | |
| Butanol | 10 | 10 | 10 | 10 | 10 | 2.5 | 5 | 10 | 10 | 10 | 2.5 | 10 |
| Ethanol (190 PF) | | | | | | 7.5 | 5 | | | | | |
| LSO-Propanol | | | | | | | | | | | 7.5 | |
| 2 ×(50% in EtOH) | 0.2 | 0.2 | 0.2 | 0.4 | 0.4 | 0.4 | 0.4 | 0.4 | 0.4 | 0.4 | 0.4 | 0.4 |
| Air Dry | 10 | 10 | 10 | 10 | 0 | 10 | 10 | 10 | 10 | 10 | 10 | 10 |
| Cure (130° C.) | 20 | 20 | 20 | 20 | 20 | 20 | 20 | 20 | 20 | 20 | 20 | 20 |
| TOPCOAT | | | | | | | | | | | | |
| 6× (30% in BuOH) | | | | | | | | | | | | 10 |
| 3× (30% in BuOH) | | | | | | | | | | | | |
| 7× (30% in (70% iPrOH) | | | | | | | | | | | | |

TABLE III-continued

|  |  |  |  |  |  |  |  |  |  |  |  |  |
|---|---|---|---|---|---|---|---|---|---|---|---|---|
| (30% BuOH) |  |  |  |  |  |  |  |  |  |  |  |  |
| 8× (30% in BuOH) | 10 | 10 | 10 | 10 | 10 | 10 | 10 | 10 | 10 | 10 | 10 |  |
| 5× |  |  |  |  |  |  |  |  |  |  |  |  |
| 1×(50% in EtOH) | 1 | 1 | 1 | 2 | 2 | 2 | 2 | 2 | 2 | 2 | 2 | 2 |
| 11× |  |  |  |  |  |  |  |  |  |  |  |  |
| 10× | 0.25 | 0.5 | 1 | 0.25 | 0.25 | 0.25 | 0.25 | 0.25 | 1 | 0.25 | 0.25 | 1.0 |
| Water |  |  |  | 0.03 | 0.03 | .03 | .03 | .03 | .03 | .03 | .03 | .02 |
| Cure (130° C.) Air |  |  |  |  |  |  |  |  |  |  |  |  |
| Dried 10 Min. | 60 | 60 | 60 | 60 | 60 | 60 | 60 | 60 | 60 | 60 | 60 | 60 |
| Water in Oven | x | x | x | x | x | x | x | x | x | x | x | x |
| No water in Oven |  |  |  |  |  |  |  |  |  |  |  |  |
| TESTS |  |  |  |  |  |  |  |  |  |  |  |  |
| Acetone (A=Attack) | OK | OK | OK | OK | OK | OK | OK | OK | OK | OK | OK | OK |
| Impact - 70 in lb Front |  |  |  |  |  |  |  |  |  |  |  |  |
| 80 in lb Front | OK |  | OK | OK | LA | OK | OK | OK | LA | LA | LA |  |
| -Back | CR | LA | OK | CR |  | CR | CR | CR | CR | CR | CR |  |
| Cross-Hatch Adhesion | 74 | 0 | 40 | 85 | 25 |  | 5 | 94 | 94 |  |  |  |

A = Attack
LA = Lost Adhesion
Cr = Cracked disc
E = Excellent
G = Good
F = Fair
P = Poor

TABLE IV

PARTS BY WEIGHT

| PRIMER |  |  |  |  |  |  |  |  |  |  |  |  |  |  |  |
|---|---|---|---|---|---|---|---|---|---|---|---|---|---|---|---|
| Butanol | 10 | 10 | 10 |  |  |  |  |  |  |  |  |  |  |  |  |
| 75% EtOH (200ff) 25% BuOH |  |  |  | 10 | 10 | 10 | 10 | 10 | 10 | 10 | 10 | 10 | 10 | 10 |  |
| 2× (50% in EtOH) | 0.4 | 0.4 | 0.4 | 0.2 | 0.2 | 0.2 | 0.2 | 0.2 | 0.2 | 0.2 | 0.2 | 0.2 | 0.2 | 0.2 |  |
| Water | 0.05 | 0.05 | 0.05 | 0.1 | 0.1 | 0.1 | 0.1 | 0.1 | 0.1 | 0.1 | 0.1 | 0.1 | 0.1 | 0.1 |  |
| Air Dry (min) | 10 | 10 | 10 | 10 | 10 | 5 | 5 | 5 | 5 | 5 | 5 | 5 | 5 | 10 |  |
| Cure - 130° C. (Min) | 20 | 20 | 20 | 20 | 20 | 20 | 20 | 20 | 20 | 20 | 20 | 20 | 20 | 20 |  |
| TOPCOAT |  |  |  |  |  |  |  |  |  |  |  |  |  |  |  |
| 6× (30% in BuOH) | 7.5 | 5 | 2.5 |  |  |  |  |  |  |  |  |  |  |  |  |
| 7× (30% in BuOH) | 2.5 | 5 | 7.5 | 10 | 10 | 10 | 10 |  |  |  |  |  |  |  |  |
| (28%n 75% EtOH) (25% BuOH) |  |  |  |  |  |  |  | 10 |  |  |  |  | 10 |  |  |
| 28% in 90% EtOH 10% BuOH |  |  |  |  |  |  |  |  | 10 |  |  |  |  |  |  |
| 28% in 95% EtOH 5% BuOH |  |  |  |  |  |  |  |  |  | 10 |  |  |  |  |  |
| 30% in 75% EtOH 25% BuOH |  |  |  |  |  |  |  |  |  |  | 10 |  |  |  |  |
| 30% in 90% EtOH 10% BuOH |  |  |  |  |  |  |  |  |  |  |  | 10 |  |  |  |
| 30% in 95% EtOH 5% BuOH |  |  |  |  |  |  |  |  |  |  |  |  |  | 10 |  |
| 2× (50% in EtOH) | 2 | 2 | 2 | .25 | .25 | .25 | .25 | .25 | .25 | .25 | .25 | .25 | .25 | .25 |  |
| 11× | 1 | 1 | 1 | 0.5 | 0.5 |  | 0.5 | 0.5 | 0.5 | 0.5 | 0.5 | 0.5 | 0.5 | 0.5 |  |
| 11× |  |  |  |  |  |  |  |  |  |  |  |  |  |  |  |
| Water | .02 | .02 | .02 |  |  |  |  |  |  |  |  |  |  |  |  |
| Air Dry (Min.) | 10 | 10 | 10 | 10 | 10 | 10 | 20 | 5 | 5 | 5 | 5 | 5 | 5 | 10 |  |
| Cure - 130° C. (Min.) | 60 | 60 | 60 | 60 | 60 | 60 | 60 | 60 | 60 | 60 | 60 | 60 | 60 | 15 |  |
| Water in Oven |  |  |  |  |  |  |  |  |  |  |  |  |  |  |  |
| No Water in Oven |  |  |  |  |  | X | X | X | X | X | X | X | X |  |  |
| TESTS |  |  |  |  |  |  |  |  |  |  |  |  |  |  |  |
| Acetone |  |  |  | OK | OK | OK | OK | OK | OK | OK | OK | OK | OK | A |  |
| Impact - 80 in.lb. |  |  |  |  |  |  |  |  |  |  |  |  |  |  |  |
| Front |  |  |  | OK | OK | OK | OK | OK | OK | OK | OK | OK | OK |  |  |
| Back |  |  |  | OK | OK | OK | CR | OK | CR | CR | CR | CR | CR |  |  |
| Cross-Hatch Adhesion (%) |  |  |  |  |  |  |  |  |  |  |  |  |  |  |  |

PARTS BY WEIGHT

| PRIMER |  |  |  |  |  |  |  |  |  |
|---|---|---|---|---|---|---|---|---|---|
| Butanol |  |  |  |  |  |  |  |  |  |
| 75% EtOH (200ff) 25% BuOH | 10 | 10 | 10 | 10 | 10 | 10 | 10 | 10 | 10 |
| 2× (50% in EtOH) | 0.2 | 0.2 | 0.2 | 0.2 | 0.2 | 0.2 | 0.2 | 0.2 | 0.2 |
| Water | 0.1 | 0.1 | 0.1 | 0.1 | 0.1 | 0.1 | 0.05 | 0.01 | 0.01 |
| Air Dry (Min) | 10 | 10 | 10 | 10 | 10 | 10 | 10 | 10 | 10 |
| Cure - 130° C. (Min) | 20 | 20 | 20 | 20 | 20 | 20 | 20 | 20 | 20 |
| TOPCOAT |  |  |  |  |  |  |  |  |  |
| 6× (30% in BuOH) |  |  |  |  |  |  |  |  |  |
| 7× (30% in BuOH) |  |  |  |  | 10 | 10 | 10 | 10 | 10 |
| (28%n 75% EtOH) |  |  |  |  |  |  |  |  |  |
| (25% BuOH) | 10 | 10 | 10 | 10 |  |  |  |  |  |

TABLE IV-continued

|  |  |  |  |  |  |  |  |  |  |
|---|---|---|---|---|---|---|---|---|---|
| 28% in 90% EtOH) |  |  |  |  |  |  |  |  |  |
| 10% BuOH) |  |  |  |  |  |  |  |  |  |
| 28% in 95% EtOH) |  |  |  |  |  |  |  |  |  |
| 5% BuOH) |  |  |  |  |  |  |  |  |  |
| 30% in 75% EtOH) |  |  |  |  |  |  |  |  |  |
| 25% BuOH) |  |  |  |  |  |  |  |  |  |
| 30% in 90%EtOH) |  |  |  |  |  |  |  |  |  |
| 10% BuOH) |  |  |  |  |  |  |  |  |  |
| 30% in 95%EtOH) |  |  |  |  |  |  |  |  |  |
| 5% BuOH) |  |  |  |  |  |  |  |  |  |
| 2× (50% in EtOH) | .25 | .25 | .25 | .25 | .25 | .25 | .25 | .25 | .25 |
| 11× | 0.5 | 0.5 | 0.5 | 0.5 | 0.5 | 0.5 | 0.5 | 0.5 |  |
| 11× |  |  |  |  |  |  |  |  | 0.5 |
| Water |  |  |  |  |  |  |  |  |  |
| Air Dry (Min.) | 10 | 10 | 10 | 10 | 10 | 10 | 10 | 10 | 10 |
| Cure - 130° C. (Min.) | 30 | 45 | 60 | 60 | 60 | 60 | 60 | 60 | 60 |
| Water in Oven |  |  |  |  |  | X | X | X | X |
| No Water in Oven | X | X | X | X | X |  |  |  |  |
| TESTS |  |  |  |  |  |  |  |  |  |
| Acetone | OK | OK | OK | OK | OK | OK | OK | OK | OK |
| Impact - 80 in.lb. |  |  |  |  |  |  |  |  |  |
| Front | OK | OK | OK | OK | OK | OK | OK | OK | OK |
| Back | LA | LA | LA | OK | OK | LA | LA | OK | LA |
| Cross-Hatch Adhesion (%) |  |  |  | 64 | 72 |  |  | 84 | 0 |

A = Attack
LA = Lost Adhesion
Cr = Cracked disc
E = Excellent
G = Good
F = Fair
P = Poor

TABLE V

PARTS BY WEIGHT

| PRIMER |  |  |  |  |  |  |  |  |  |  |  |  |  |  |  |  |  |
|---|---|---|---|---|---|---|---|---|---|---|---|---|---|---|---|---|---|
| 75% EtOH (200) | 10 | 10 | 10 | 10 | 10 | 10 | 10 | 10 | 10 | 10 | 10 | 10 | 10 | 10 |  |  |  |
| 25% BuOH |  |  |  |  |  |  |  |  |  |  |  |  |  |  |  |  |  |
| 2×(50% Solids) | 0.2 | 0.2 | 0.2 | 0.2 | 0.2 | 0.2 | 0.2 | 0.2 | 0.2 | 0.2 | 0.2 | 0.2 | 0.2 | 0.2 |  |  |  |
| 1×(100% Solids) |  |  |  |  |  |  |  |  |  |  |  |  |  |  |  |  |  |
| Water | — | 0.025 | 0.05 | 0.075 | 0.1 | 0.1 | 0.1 | 0.1 | 0.1 | 0.1 | 0.1 | 0.1 | 0.1 | 0.1 |  |  |  |
| Cure (130° C.) - Air Dried 10 Min | 20 | 20 | 20 | 20 | 15 | 30 | 45 | 60 | 20 | 15 | 30 | 45 | 60 | 60 |  |  |  |
| TOPCOAT |  |  |  |  |  |  |  |  |  |  |  |  |  |  |  |  |  |
| (70% iPrOH) |  |  |  |  |  |  |  |  |  |  |  |  |  |  |  |  |  |
| 7× (30% -30%BuOH) |  |  |  |  |  |  |  |  |  |  |  |  |  |  |  |  |  |
| 8× (30% in BuOH) | 10 | 10 | 10 | 10 | 10 | 10 | 10 | 10 | 10 | 10 | 10 | 10 | 10 | 10 | 10 | 10 | 10 |
| 2× (50% in EtOH) | .25 | .25 | .25 | .25 | .25 | .25 | .25 | .25 | .25 | .25 | .25 | .25 | .25 | .25 | .25 | .25 | .25 |
| 11× | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Water |  |  |  |  |  |  |  |  | 0.1 |  |  |  |  |  |  |  |  |
| Cure (130° C.) - Air Dried 10 Min | 60 | 60 | 60 | 60 | 60 | 60 | 60 | 60 | 60 | 60 | 60 | 60 | 60 | 60 | 60 | 60 | 60 |
| Water in oven |  |  |  |  | x | x | x | x | x | x | x | x | x | x | x | x | x |
| No water in oven | x | x | x | x |  |  |  |  |  |  |  |  |  |  |  |  |  |
| TESTS |  |  |  |  |  |  |  |  |  |  |  |  |  |  |  |  |  |
| Acetone (A-Attack) | OK | OK | OK | OK | OK | OK | OK | OK | OK | OK | OK | OK | OK | OK | A | A | A |
| Impact-80 in lb. FRT | OK | OK | OK | OK | OK | OK | OK | OK | OK | OK | OK | OK | OK | OK | OK | OK | OK |
| BACK | OK | OK | OK | OK | OK | OK | OK | OK | OK | OK | OK | OK | OK | OK | OK | OK | OK |
| Cross-Hatch Adhesion (%) | 0 | 0 | 24 | 28 | 34 | 72 | 94 | 96 | 28 | 76 | 94 | 96 | 98 | 98 | 0 | 0 | 0 |
| COMMENTS |  |  |  |  |  |  |  |  |  |  |  |  |  |  |  |  |  |
| % Solids of 8× if not 30% |  |  |  |  |  |  |  |  |  |  |  |  |  |  |  | 25 | 20 |

PARTS BY WEIGHT

| PRIMER |  |  |  |  |  |  |  |  |  |  |
|---|---|---|---|---|---|---|---|---|---|---|
| 75% EtOH (200) |  | 10 | 10 | 10 | 10 | 10 | 10 | 10 | 10 | 10 |
| 25% BuOH |  |  |  |  |  |  |  |  |  |  |
| 2×(50% Solids) |  | 0.2 | 0.15 | 0.1 | 0.05 | — | 0.15 | 0.1 | 0.05 | — | 0.2 |
| 1×(100% Solids) |  |  | 0.05 | 0.1 | 0.15 | 0.2 | 0.05 | 0.1 | 0.15 | 0.2 | — |
| Water |  | 0.1 | 0.1 | 0.1 | 0.1 | 0.1 | 0.1 | 0.1 | 0.1 | 0.1 | 0.1 |
| Cure (130° C.) - Air Dried 10 Min |  | 60 | 15 | 15 | 15 | 15 | 30 | 30 | 30 | 30 | 60 |
| TOPCOAT |  |  |  |  |  |  |  |  |  |  |  |
| (70% iPrOH) |  |  |  |  |  |  |  |  |  |  |  |
| 7× (30% -30% BuOH) |  | 10 |  |  |  |  |  |  |  |  | 10 |
| 8×(30% in BuOH) | 10 |  | 10 | 10 | 10 | 10 | 10 | 10 | 10 | 10 |  |
| 2×(50% in EtOH) | .25 | .25 | .25 | .25 | .25 | .25 | .25 | .25 | .25 | .25 | .25 |
| 11× | 0.5 | 0.5 | 0.5 | 0.5 | 0.5 | 0.5 | 0.5 | 0.5 | 0.5 | 0.5 | 0.5 |

TABLE V-continued

| | | | | | | | | | | | |
|---|---|---|---|---|---|---|---|---|---|---|---|
| Water | | | | | | | | | | | |
| Cure (130° C.) - Air | | | | | | | | | | | |
| Dried 10 Min. | 60 | 60 | 60 | 60 | 60 | 60 | 60 | 60 | 60 | 60 | 60 |
| Water in oven | x | x | x | x | x | x | x | x | x | x | x |
| No water in oven | | | | | | | | | | | |
| TESTS | | | | | | | | | | | |
| Acetone (A-Attack) | A | OK | OK | OK | A | A | OK | OK | A | A | A |
| Impact-80 in lb. FRT | OK | OK | OK | OK | OK | OK | OK | OK | OK | OK | OK |
| BACK | OK | OK | OK | OK | OK | OK | OK | OK | OK | OK | OK |
| Cross-Hatch Adhesion (%) | 0 | 96 | 99 | 99 | 92 | 80 | 99 | 97 | 97 | 94 | 98 |
| COMMENTS | | | | | | | | | | | |
| % Solids of 8× if not 30% | 15 | | | | | | | | | | |

A = Attack
LA = Lost Adhesion
Cr = Cracked Disc
E = Excellent
G = Good
F = Fair
P = Poor

TABLE VI

| PARTS BY WEIGHT | | | | | | | | | | | |
|---|---|---|---|---|---|---|---|---|---|---|---|
| PRIMER | | | | | | | | | | | |
| 75% EtOH (200)-25% BuOH | 10 | 10 | 10 | | | 10 | | | | 10 | |
| 1× (100% Solids) | | | | | | | | | | | |
| 2× (50% in EtOH) | 0.2 | 0.2 | 0.2 | | | 0.2 | | | | 0.2 | |
| Water | 0.1 | 0.1 | 0.1 | | | 0.1 | | | | 0.1 | |
| Cure (130° C.)-Air | | | | | | | | | | | |
| Dried 10 Min. | 60 | 60 | 60 | | | 60 | | | | 60 | |
| TOPCOAT | | | | | | | | | | | |
| 51% EtOH) 6×30% in 49% BuOH) | 10 | 10 | 10 | 10 | 10 | 10 | | | 10 | 10 | 10 | 10 |
| 8× 30% in BuOH | | | | | | | 4.2 | 4.2 | | | | |
| 2× 50% in EtOH | 0.25 | 0.25 | 0.25 | 0.25 | 0.25 | 0.25 | 0.1 | 0.1 | 0.25 | 0.25 | 0.25 | 0.25 |
| 11× | 0.5 | 0.5 | 0.5 | 0.5 | 0.5 | 0.5 | 0.5 | 0.5 | 0.5 | 0.5 | 0.5 | 0.5 |
| Cure (130° C.) - Air | | | | | | | | | | | | |
| Dried 10 Min. | 60 | 60 | 60 | 60 | 60 | 60 | 60 | 60 | 120 | 120 | 120 | 60 |
| Water in Oven | X | X | X | X | X | X | X | X | X | X | X | X |
| TESTS | | | | | | | | | | | | |
| Acetone (A = Attack) | OK | OK | OK | A | A | A | OK | A | A | A | A | OK |
| Impact - 80 in. lb | | | | | | | | | | | | |
| Front | OK | OK | OK | LA | OK | OK | — | — | OK | OK | OK | OK |
| Back | OK | OK | OK | LA | OK | OK | — | — | OK | OK | OK | OK |
| Cross-Hatch Adhesion | 99 | 99 | 99 | 96 | 98 | 96 | 97 | 80 | 96 | 96 | 100 | 99 |
| COMMENTS | | | | | | | | | | | | |
| % Solids of 6× If Not 30% | 40 | | 20 | 40 | | 20 | | | | | | |

| PARTS BY WEIGHT | | | | | | | | | |
|---|---|---|---|---|---|---|---|---|---|
| PRIMER | | | | | | | | | |
| 75% EtOH (200)-25% BuOH | 10 | | 10 | 10 | 10 | 10 | 10 | 10 | |
| 1× (100% Solids) | | | | 0.15 | 0.1 | .05 | 0.2 | | |
| 2× (50% in EtOH) | 0.2 | | 0.2 | 0.05 | 0.1 | 0.15 | | 0.2 | |
| Water | 0.1 | | 0.1 | 0.1 | 0.1 | 0.1 | 0.1 | 0.1 | |
| Cure (130° C.)-Air | | | | | | | | | |
| Dried 10 min. | 60 | | 30 | 30 | 30 | 30 | 30 | 15 | |
| TOPCOAT | | | | | | | | | |
| 51% EtOH) 6×30% in 49% BuOH) | 10 | | | | | | | | |
| 8× 30% in BuOH | | 10 | 10 | | | | | | |
| 2× 50% in EtOH | 0.25 | 0.25 | 0.25 | | | | | | |
| 11× | 0.5 | 0.5 | 0.5 | | | | | | |
| Cure (130° C.) - Air | | | | | | | | | |
| Dried 10 Min. | 120 | 60 | 120 | | | | | | |
| Water in Oven | X | X | X | X | X | X | X | X | |
| TESTS | | | | | | | | | |
| Acetone (A = Attack) | OK | OK | OK | OK | OK | A | A | A | A |
| Impact - 80 in. lb | | | | | | | | | |
| Front | OK | OK | OK | — | — | — | — | — | |
| Back | OK | OK | OK | — | — | — | — | — | |
| Cross-Hatch Adhesion | 95 | 97 | 99 | | | | | | |

TABLE VI-continued

| COMMENTS |
|---|
| % Solids of 6× |
| If Not 30% |

A = Attack
LA = Lost Adhesion
Cr = Cracked disc
E = Excellent
G = Good
F = Fair
P = Poor

TABLE VII

PARTS BY WEIGHT

| PRIMER | | | | | | | | | | | | | | |
|---|---|---|---|---|---|---|---|---|---|---|---|---|---|
| 75% EtOH (200 PF)-25% BuOH | 10 | 10 | 10 | 10 | 10 | 10 | 10 | 10 | 10 | 10 | 10 | 10 | 10 | 10 |
| 2× (50% in EtOH) | 0.3 | | 0.3 | 0.3 | 0.3 | 0.3 | 0.3 | 0.3 | 0.3 | 0.3 | 0.3 | 0.3 | 0.3 | 0.3 |
| 1× | .15 | .15 | | .15 | .15 | .15 | .15 | .15 | .15 | .15 | .15 | .15 | .15 | .15 |
| Cure (130° C.) - Air Dried 10 Min. | 60 | 60 | 60 | 60 | 60 | 60 | 60 | 60 | 60 | 15 | 15 | 30 | 30 | 60 |
| TOPCOAT | | | | | | | | | | | | | | |
| 14× | | | | | | | | | | | | | | |
| 1× | .12 | .12 | .12 | .12 | .12 | .12 | .12 | .12 | .12 | .12 | .12 | .12 | .12 | .12 |
| 15× | | | | 10 | 10 | 10 | | | | | | | | 10 |
| Methyl Vinyl Diacetoxy Silane | | | | | | | | | | | | | | |
| Benzoyl Peroxide (10% in Benzene | | | | | | | | | | | | | | |
| $H_2O$ | 0.8 | 0.8 | 0.8 | 0.5 | 0.4 | 0.3 | 0.8 | 0.8 | 0.8 | 0.8 | 0.8 | 0.8 | 0.8 | 0.6 |
| Cure (130° C.) - Air Dried 10 Min. | 60 | 60 | 60 | 60 | 60 | 60 | 15 | 30 | 60 | 15 | 30 | 15 | 30 | 60 |
| Clean with FreonTF | X | X | X | X | X | X | X | X | X | X | X | X | X | X |
| Method of Coating | | | | | | | | | | | | | | |
| Primer | F | F | F | F | F | F | F | F | F | F | F | F | F | F |
| Topcoat | F | F | F | F | F | F | F | F | F | F | F | F | F | F |
| TESTS | | | | | | | | | | | | | | |
| Acetone | OK | OK | OK | OK | OK | OK | OK | OK | OK | OK | OK | OK | OK | OK |
| Amoco non-lead Prem. Gas | OK | OK | OK | OK | OK | OK | OK | OK | OK | OK | OK | OK | OK | OK |
| Impact-80 in.lb.-Front | OK | OK | OK | OK | OK | OK | OK | OK | OK | OK | OK | OK | OK | OK |
| Back | OK | OK | LA | OK | OK | OK | OK | OK | CR | OK | OK | OK | OK | OK |
| Cross-Hatch Adhesion (Lepage) | — | — | — | 100 | 100 | 100 | 100 | 100 | 100 | 99 | 100 | 100 | 100 | 98 |
| (Mystic 6432) | — | — | — | 100 | 100 | 100 | 100 | 100 | 100 | 100 | 100 | 100 | 100 | 100 |
| (3M-710) | 100 | 100 | 50 | 100 | 100 | 100 | 100 | 100 | 100 | 100 | 100 | 100 | 100 | 100 |
| Abrasion - Taber 100 Cycles -CS10F Wheel - 500GM | E | E | E | E | G | G | E | E | E | G | G | G | G | G |

PARTS BY WEIGHT

| PRIMER | | | | | | | | | | |
|---|---|---|---|---|---|---|---|---|---|---|
| 75% EtOH (200 PF)-25% BuOH | 10 | 10 | 10 | 10 | 10 | 10 | 10 | 10 | 10 | 10 |
| 2× (50% in EtOH) | 0.3 | 0.3 | 0.3 | 0.3 | 0.3 | 0.3 | 0.3 | 0.3 | 0.3 | 0.3 |
| 1× | .15 | .15 | .15 | .15 | .15 | .15 | .15 | .15 | .15 | .15 |
| Cure (130° C.) -Air Dried 10 Min. | 60 | 60 | 60 | 60 | 60 | 60 | 60 | 60 | 60 | 60 |
| TOPCOAT | | | | | | | | | | |
| 14× | | | | | 10 | 10 | 10 | 10 | 10 | |
| 1× | .12 | .12 | .12 | .12 | | | | .12 | | .12 |
| 15× | 10 | 10 | | | | | | | | |
| Methyl Vinyl Diacetoxy Silane | | | 1.0 | 1.0 | | | | | | |
| Benzoyl Peroxide (10% in Benzene | | | 1.0 | 1.0 | | | | | | |
| $H_2O$ | 0.7 | 0.8 | 0.8 | 0.8 | | 0.2 | 0.4 | 0.6 | 0.8 | 0.8 |
| Cure (130° C.) - Air Dried 10 min. | 60 | 60 | 15 | 30 | 30 | 30 | 30 | 30 | | 60 |
| Clean with FreonTF | X | X | X | X | X | X | X | X | X | X |
| Method of Coating | | | | | | | | | | |
| Primer | F | F | F | F | F | F | F | F | F | D |
| Topcoat | F | F | F | F | F | F | F | F | F | F |
| TESTS | | | | | | | | | | |
| Acetone | OK | OK | OK | OK | Poor Wetting | Poor Wetting | Poor Wetting | OK | Topcoat Solution | OK |
| Amoco non-lead Prem. Gas | OK | OK | OK | OK | | | | OK | | OK |
| Impact-80 in.lb.- | | | | | | | | | | |

TABLE VII-continued

| | | | | | | | | | | | |
|---|---|---|---|---|---|---|---|---|---|---|---|
| Front | OK | OK | OK | OK | | | | OK | Gelled | OK | |
| Back | OK | CR | OK | OK | | | | OK | | OK | |
| Cross-Hatch Adhesion (Lepage) | 100 | 98 | 98 | 100 | Poor Wetting | Poor Wetting | Poor Wetting | 99 | Topcoat | 99 | |
| (Mystic 6432) | 98 | 100 | 98 | 100 | | | | 100 | Solution Gelled | 100 | |
| (3M-710) | 100 | 100 | 98 | 100 | | | | 100 | | 100 | |
| Abrasion - Taber 100 Cycles -CS10F Wheel - 500GM | E | E | G | G | | | | G | | E | |

A = Attack
LA = Lost Adhesion
Cr = Cracked Disc
E = Excellent
G = Good
F = Fair
P = Poor

TABLE VIII

PARTS BY WEIGHT

PRIMER

| | | | | | | | | | | | | | | | | |
|---|---|---|---|---|---|---|---|---|---|---|---|---|---|---|---|---|
| 75% EtOH (200 PF) - 25% BuOH | 10 | 10 | 10 | 10 | 10 | 10 | 10 | | 10 | 10 | 10 | 10 | 10 | 10 | 10 |
| 2× (50% in EtOH) | 0.2 | 0.2 | 0.2 | 0.2 | 0.2 | 0.2 | 0.2 | | 0.2 | 0.6 | 0.6 | 0.6 | 0.6 | 0.6 | 0.6 |
| 12× | | | | | | | | 0.1 | | | | | | | |
| $H_2O$ | 0.4 | 0.4 | 0.4 | 0.4 | 0.4 | 0.4 | | | 0.2 | 0.2 | 0.2 | 0.2 | 0.2 | 0.2 | 0.2 |
| Cure (130° C.) - Air Dried 10 min. | 60 | 60 | 60 | 60 | 60 | 60 | 15 | | 60 | 60 | 60 | 60 | 60 | 60 | 60 |

TOPCOAT

| | | | | | | | | | | | | | | | | |
|---|---|---|---|---|---|---|---|---|---|---|---|---|---|---|---|---|
| 2× (50% in EtOH) | 7.5 | 5 | 2.5 | 7.5 | 5 | 2.5 | 10 | 2.5 | 2.5 | 10 | 10 | 2.5 | 1.0 | 2.5 | 2.5 | 2.5 |
| MeSi(oMe)₃ | | | | 2.5 | 5 | 7.5 | | | | | | | | | | |
| 12× | 2.5 | 5 | 7.5 | | | | | 7.5 | 7.5 | | | 7.5 | 9.0 | 7.5 | 7.5 | 7.5 |
| $H_2O$ | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Cure (130° C.) - Air Dried 10 min. | 60 | 60 | 60 | 60 | 60 | 60 | 60 | 60 | 180 | 60 | 60 | 60 | 60 | 60 | 60 | 60 |
| Cleaned with Freon TF Vapor | | | | | | | | | | x | x | x | x | x | x | x |

TESTS

| | | | | | | | | | | | | | | | | |
|---|---|---|---|---|---|---|---|---|---|---|---|---|---|---|---|---|
| Acetone | OK | OK | OK | OK | OK | OK | OK | OK | OK | OK | OK | OK | OK | OK | OK | OK |
| Amoco non-lead Prem. Gas | OK | OK | OK | OK | OK | OK | OK | OK | OK | OK | OK | OK | OK | OK | OK | OK |
| Impact - 80 in. lb.- Front | OK | OK | OK | OK | OK | OK | LA | LA | LA | OK | OK | OK | OK | OK | OK | OK |
| Back | OK | OK | OK | OK | OK OK | LA | LA | LA | OK | OK | OK | LA | LA | OK | OK | |
| Adhesion (cross-Hatch) (7%) | 32 | 66 | 99 | 40 | 0 | 5 | 0 | 0 | 0 | 0 | 0 | 99 | 99 | 99 | 99 | 99 |
| Taber Abrasion - (100 cycles) - CS10F | G | G | G | G | G | G | G | G | G | G | G | G | G | G | P | P |

A = Attack
LA = Lost Adhesion
Cr = Cracked disc
E = Excellent
G = Good
F = Fair

We claim:

1. A silicone primer composition for plastics, metals, glass and ceramic comprising; (a) from 0 to 40% by weight of hydroxypropyltriethoxysilane; (b) 1 to 40% by weight of the reaction product of the foregoing silane and an anhydride selected from the class consisting of cyclic anhydrides and cyclic dianhydrides; and (c) 20 to 99% by weight of an aliphatic solvent having 1 to 8 carbon atoms.

2. The primer composition of claim 1 wherein the solvent is n-butanol.

3. The primer composition of claim 1 wherein the anhydride is selected from the class consisting of maleic anhydride, nadic anhydride, phthalic anhydride and succinic anhydride.

* * * * *